United States Patent
Lebling et al.

(10) Patent No.: US 10,887,334 B2
(45) Date of Patent: Jan. 5, 2021

(54) SOUND REPUTATION

(71) Applicant: BAE SYSTEMS Information and Electronic Systems Integration Inc., Nashua, NH (US)

(72) Inventors: Peter D. Lebling, Concord, MA (US); Clifton A. Lin, Arlington, MA (US); Andrew J. Macbeth, Westford, MA (US); Karen D. Uttecht, Chelmsford, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 230 days.

(21) Appl. No.: 16/123,099

(22) Filed: Sep. 6, 2018

(65) Prior Publication Data

US 2020/0084232 A1 Mar. 12, 2020

(51) Int. Cl.
*H04L 29/06* (2006.01)
*H04W 4/38* (2018.01)
(Continued)

(52) U.S. Cl.
CPC ........ *H04L 63/1425* (2013.01); *H04L 63/101* (2013.01); *H04L 63/102* (2013.01); *H04L 63/1441* (2013.01); *H04L 63/20* (2013.01); *H04W 4/38* (2018.02); *H04W 8/18* (2013.01); *H04W 4/60* (2018.02)

(58) Field of Classification Search
CPC ........ G06F 17/30; G06F 12/0871; G06F 7/00; G06F 15/173; G06F 11/07; G06F 21/00; G06Q 30/00; H04L 29/06; H04L 63/1425; H04L 63/101; H04L 63/102;
(Continued)

(56) References Cited

U.S. PATENT DOCUMENTS 7,870,200 B2 * 1/2011 Slater ............... G06Q 10/107
702/187
2013/0298244 A1 * 11/2013 Kumar ............... H04L 67/10
726/25

(Continued)

OTHER PUBLICATIONS

Figueroa et al., "A SOUND Approach to Security in Mobile and Cloud-Oriented Environments", Advanced Information Technologies (AIT), BAE Systems: At least as early as Apr. 2015.
(Continued)

*Primary Examiner* — Thanhnga B Truong
(74) *Attorney, Agent, or Firm* — KPIP Law, PLLC; Scott J. Asmus (57) ABSTRACT

A cybersecurity system and method utilizing SOUND reputation, where a set of reputations are associated with each actor on a network. The actors on a network may be users, hosts, applications, and the like. The associated reputations are aggregated and updated as new information about an actor's activity is reported according to a defined and modifiable protocol, or policy. The actor's activity may be reported by one or more threat sensors. The effect of a particular misbehavior can be tuned to match the needs of the specific network. When a bad actor's reputation sinks too low, the system can take whatever action is appropriate: reports can be sent, an operator can be notified, the offender can be cut off from the network, or the like.

16 Claims, 8 Drawing Sheets

(51) Int. Cl.
*H04W 8/18* (2009.01)
*H04W 4/60* (2018.01)

(58) Field of Classification Search
CPC ...... H04L 63/1441; H04L 63/20; H04W 4/38; H04W 8/18
See application file for complete search history.

(56) References Cited

U.S. PATENT DOCUMENTS

2014/0282893 A1* 9/2014 Sheller .................... H04L 63/08
726/4
2016/0359917 A1* 12/2016 Rao ......................... H04L 45/74

OTHER PUBLICATIONS

Yu et al., "A Social Mechanism of Reputation Management in Electronic Communities", Department of Computer Science, North Carolina State University: At least as early as Jul. 2000.
Sabater et al., "REGRET: A reputation model for gregarious societies", IIIA—Artificial Intelligence Research Institute/CSIC—Spanish Scientific Research Council: At least as early as Aug. 2002.
Sabater et al., "Reputation and Social Network Analysis in Multi-Agent Systems", IIIA—Artificial Intelligence Research Institute/CSIC—Spanish Scientific Research Council: At least as early as Jul. 2002.

\* cited by examiner

SOUND REPUTATION

STATEMENT OF GOVERNMENT INTEREST

This invention was made with United States Government support under Contract No. FA8650-11C-7189 awarded by the United States Air Force. The United States Government has certain rights in this invention.

FIELD OF THE DISCLOSURE

The present disclosure relates to cyber security and more particularly to the use of a reputation system to monitor internal and external actors and activities over time to identify and mitigate attacks.

BACKGROUND OF THE DISCLOSURE

It is understood that computer networks are vulnerable to insider and outsider threats that are unpredictable and constantly changing. Existing solutions concentrate on statically defined threats from individuals and malicious software. Except for blatant attacks it typically takes a long time to discover and counter such threats. Wherefore it is an object of the present disclosure to overcome the above-mentioned shortcomings and drawbacks associated with the conventional cyber security systems.

SUMMARY

One aspect of the present disclosure is a network security method comprising: storing, within an identity service, identity data associated with each of a plurality of actors, the plurality of actors being associated with one or more communities; providing a policy engine configured to apply one or more reputation policies to the plurality of actors; collecting impression data for one or more activities of the plurality of actors via one or more sensors; storing the impression data in an impression history; calculating, via a reputation service, reputation data for at least one of the actors associated with the one or more communities based, in part, on impression data; storing the reputation data in at least a reputation store; accessing at least one of a black list, a white list, or the reputation store; updating, via the reputation service, the reputation data for the at least one of the actors; and sharing the reputation data for the at least one of the actors with at least one subscriber.

One embodiment of the network security method is wherein the plurality of actors comprises users, hosts, and applications. In some cases, the black list represents lists of identities that are never allowed to connect regardless of their reputation and the white list represents lists of identities that are always allowed to connect regardless of their reputation.

Another embodiment of the network security method is wherein the one or more reputation policies comprise reputation parameters including reputation threshold values for the plurality of actors and decay rates for the one or more activities of the plurality of actors. In some cases, the one or more reputation policies comprise configurable reputation parameters including the ability to add or subtract members from the black list and/or the white list. In certain embodiments, the configurable reputation parameters further include associating different decay curves with different identities, categories of identities, communities, or categories of behavior.

Yet another embodiment of the network security method is wherein calculating a reputation comprises calculating one or more of a social reputation, a subjective reputation, or a social reliability. In some cases, wherein calculating a social reputation comprises proportional contributions from a2b, A2b, a2B, and A2B.

In certain embodiments, reputation data comprises all undecayed impressions attributed to interactions of individual to individual, individual to community, and community to community. In some cases, the network security method further comprises linking the identities of actors from multiple communities such that their reputations are affected by actions in each community, rather than being independent.

In some embodiments, sharing reputation data comprises a subscription service to provide notifications of changes in reputation for various members of the network. In some cases, the network security method further comprises automatically acting on shared reputation data including enabling or disabling access between individual actors and or communities.

Another aspect of the present disclosure is a network security system comprising: one or more external sensors; a database of identities; a database of received impressions; a database of reputations; and a set of reputation parameters that may be set at start-up time or optionally during a session, wherein components are configured to calculate current reputations between pairs of identities and store them in the reputation database.

One embodiment of the network security system further comprises a trust service configured to query at least the reputation database to determine if a pair of identities are permitted to connect.

Another embodiment of the network security system further comprises an identity service configured to store authentication information about Identities.

Yet another embodiment of the network security system further comprises a service configured to convert sensor reports in an external format into an impression format.

These aspects of the disclosure are not meant to be exclusive and other features, aspects, and advantages of the present disclosure will be readily apparent to those of ordinary skill in the art when read in conjunction with the following description, appended claims, and accompanying drawings.

BRIEF DESCRIPTION OF THE DRAWINGS

The foregoing and other objects, features, and advantages of the disclosure will be apparent from the following description of particular embodiments of the disclosure, as illustrated in the accompanying drawings in which like reference characters refer to the same parts throughout the different views. The drawings are not necessarily to scale, emphasis instead being placed upon illustrating the principles of the disclosure.

DETAILED DESCRIPTION OF THE DISCLOSURE

In one embodiment of the SOUND Reputation system of the present disclosure, a set of reputations are associated with each actor on a network. In some cases, the actors on a network are users, hosts, applications, and the like. These associated reputations are aggregated and updated as new information about an actor's activity is reported according to a defined protocol, or policy. In some cases, the actor's activity is reported by one or more threat sensors. In certain embodiments of the SOUND reputation system of the present disclosure, the effect of a particular misbehavior can be tuned to match the needs of the specific network. In some cases, when a bad actor's reputation sinks too low, the system can take whatever action is appropriate: reports can be sent, an operator can be notified, the offender can be cut off from the network, or the like.

Any application where identifiable actors perform identifiable actions which have different implications for security, especially those applications where some benign activities can add up to bad activities over time would benefit from the system of the present disclosure. Additionally, applications that need many degrees of freedom in evaluating the reputation implications of an action in addition to or instead of having actions that are immediately classed as emergencies would benefit from the system of the present disclosure.

In certain embodiments, the SOUND Reputation system provides an extensible configurable reputation system that is able to detect and respond to attacks in a way that follows threats beyond individual actors to communities of users or hosts, applications, etc. SOUND Reputation parameters may be tuned to fit the needs of a variety of communities, each of which face different threat profiles or reactivity needs.

It is understood that networks, even highly secure ones, are vulnerable to insider threats. Insiders often have privileges that give them access to sensitive information or allow them to perform actions which are forbidden to outsiders. Insiders can also mount persistent attacks that chip away at protections via small actions that are relatively harmless if performed once but can add up to major breaches of network security. These "harmless" activities may be logged but are hard to recognize in the flood of log information, and even if recognized are hard to distinguish from normal behavior. Systems that react forcefully against such small actions produce too many false positives, systems that ignore them fail to recognize real attacks.

One embodiment of system of the present disclosure uses sensors, trust and reputation to provide defense in depth for networks. The system is a network defender that receives sensor observations of activities performed by and against network-wide identities and aggregates and evaluates them to modify the "reputation" of each identity. In certain embodiments, the system is sensor agnostic. In some cases, the sensor may be similar to Snort, a software package that performs real-time traffic analysis and packet logging on Internet Protocol (IP) networks. In some cases, the sensor monitors activities that may include, but are not limited to, probes or attacks, including, but not limited to, operating system fingerprinting attempts, semantic URL attacks, buffer overflows, server message block probes, and stealth port scans.

Bad behavior by an identity (typically a host or user) reduces its reputation to a degree associated with the actual activity sensed. Individual low-danger activities can add up to significant lowering of reputation and eventual severing of the offending identity from the network. High-danger activities can result in immediate disconnection. SOUND provides broad resilience to attacks because what is detected is behaviors, not (e.g.) virus signatures. SOUND Trust provides a simple sensor platform which supports easy addition of new sensors and new "suspicious activities," and many ways to adjust its evaluation of behavior events, otherwise known as "impressions." In certain embodiments, "activities" are defined by the user/system by way of policies. The policies define something "bad" with or without the use of sensors. In some cases, a policy might simply be programmatic such as if an A happens, and if B happens and actor is C, then X.

In certain embodiments, the SOUND platform consists of a network layer which is an implementation of a modified Introduction-Based Routing (IBR) extended with a SOUND-IBR "plugin," an Identity Service which keeps track of hosts, users, applications and communities that make up the network, and finally the Trust and Reputation Services, which will be discussed in more detail herein.

The SOUND-IBR "plugin" is invoked by IBR before, or instead of, IBR's own reputation handling code. A "plugin" is module of code that uses the same interfaces as another and so requires no changes to the program using it. The SOUND-IBR plugin receives misbehavior messages directed to IBR from other IBR instances and from misbehavior sensors, and then forwards them to SOUND Reputation instead of to IBR's reputation module.

In one embodiment, SOUND-IBR is an extension of IBR which adds a plugin to use SOUND policies instead of built-in IBR policies in the area of trust and reputation. For example, when IBR is about to create a connection between two entities, the plugin asks SOUND if the entities are trusted to do so. SOUND consults its reputation store and its black list and white list, and responds appropriately. In some cases, the plugin also receives reputation updates from SOUND, which it uses instead of the built-in IBR algorithm.

In certain embodiments, an Impression History is a record of all impressions received. In some cases, a Reputation Store is a database of all reputations, including both individual-to-individual and Community-to-individual and Community-to-Community data. Also contains a pairwise record of all still undecayed impressions. In certain embodiments of the system, impressions are removed from the store, though not the History, when they decay function reaches zero. In some cases, the Blacklist and the Whitelist are pairs of individuals either never permitted to connect, or always permitted to connect regardless of actual reputation.

Within the SOUND system, trust is based on the history of interactions between Identities. Every Identity is part of a Community (although, as we shall see, Identities can be linked to Identities in other Communities). Every Community is served by an Identity Service. Sometimes an Identity Service supports multiple communities. An Identity is unique within a Community and therefore within an Identity Service.

In certain embodiments of the system of the present disclosure, an Identity Service (IS) maintains the descriptions of all users, applications, hosts, sensors and other named entities it is aware of. The IS may be responsible for one or more communities which are the "homes" of a set of entities. In some cases, the IS may also have a local view of any non-local Communities that it has interacted with, although in some networks all communities are local. The Identity Service also keeps track of network addresses of hosts with fixed addresses.

The SOUND Identity Service permits Identities from one Community to be "introduced" into other Communities. The result is a new Identity that is linked to the "parent" Identity. For example, if Alice, a member of Community A, needs to work in Community B, she can be introduced to that Community via its Identity Service, resulting in a new Identity (possibly with the same name, but with a unique Identity Handle). The Identity Service of Community B remembers that "Alice-B" is an avatar of Alice in Community A. If a feedback message is received about Alice-B, it may be used to update not only Alice-B's reputation but also sent back to the parent Community, where it can impact the original Alice.

There are two sorts of reputation sharing of interest in SOUND. First, changes in reputation for an Identity in another Community may be reported to that Community, either by forwarding the feedback messages or by forwarding the calculated reputations. Second, the Introducer of an Identity may be informed of reputation changes for the introduced Identity. For example, if Alice-B (who was introduced from Community A) misbehaves, the feedback can be forwarded back to Community A). The main risk of such forwarding is that it may increase traffic between Communities, and it is thus an optional feature in the SOUND system.

In some embodiment, an interaction's outcome is reported to the Trust Service. The outcome can result from good behavior or bad behavior. A report is ultimately of the form: [observer, observed, outcome, rating, timestamp], where "observer" is the Identity that is the source of the report, "observed" is the Identity that is the subject of the report, the "outcome" is what happened, the rating is a number between zero (very low rating) and one (very high rating), and the timestamp is when the report was generated.

In some cases, when a report is received it is stored in the History, and then the stored reputations of the Identities involved in the interaction are updated. Updating the reputations is done by computing a time-weighted average of the ratings in all active reports involving the observed entity. An active report is one that has not decayed to a zero time-weight. In some embodiments of the system, there are four relations of interest: 1) observer's opinion of observed; 2) observer community's opinion of observed; 3) observer's opinion of observed's community; and 4) observer community's opinion of observed's community.

In one embodiment of the system of the present disclosure, the reputation values are combined to produce what is called the "social reputation" between observer and observed. The reputation of an observed with a Community as opposed to an observer Identity is also sometimes used, such as in the case of determining whether to authenticate an Identity.

Reputation in the SOUND system is subjective. That means that feedback messages are always attributed. A specific Identity is the "observer" giving the feedback, and another specific Identity is the "observed" entity. So, if negative feedback is received, it is always in the form "Identity A reports that Identity B performed some activity O." This makes feedback attributable, and thus can enable policies such as "Tit for Tat," where observer entities take a reputation hit as well as observed entities. In some embodiments, Tit for Tat, as used in Sound IBR, helps prevent false reports from being used as Denial of Service attacks. For example, when the question is asked, "Can Alice be trusted?" it is asked on behalf of either an Identity or a Community. When negative feedback is received about Alice from Bob, Alice's reputation suffers. First, Bob is less likely to trust Alice in the future. Second, other members of Bob's Community are less likely to trust Alice. Finally, both Bob and members of his Community are less likely to trust members of Alice's Community.

In certain embodiment of the SOUND system, SOUND trust supports a great deal of flexibility in policy definition and outcomes. Feedback processing is done by registered policy engines which all adhere to the same interface. In addition, policy parameters can be changed from a SOUND Administration console. In one embodiment, feedback aging is controlled by setting a maximum lifetime of an item of feedback, and in addition the function that calculates the aging of the items can be replaced. For example, REGRET, in its initial description and implementation, had straight-line decay. That means that an item of feedback, if its maximum age was twenty-four hours, would have decayed to fifty percent after twelve hours, and twenty five percent after eighteen hours. In some cases, other shapes for the decay curve, concentrating various distribution functions, are possible. In certain cases, the maximum age of "good" feedback and "bad" feedback may be set to different values, thus permitting different values for good and bad feedback to quickly forget good interactions, but remember bad ones for a long time ("holding a grudge"). It is of course possible to do just the opposite ("forgive and forget"). In another embodiment, feedback can also be weighted by how well the observer "knows" the observed. In some cases, up to some threshold number of interactions, the weight of the feedback can be reduced proportionately.

The way in which the different types of reputation (Identity-to-Identity, Identity-to-Community, etc.) are combined may also be manipulated. SOUND initially gives the Identity-to-Identity and Community-to-Identity reputations well over fifty percent of the weight in the combination, but one could create very "anti-social" settings where the Community experience has very little weight. Under the REGRET Reputation Management System (RMS), an interaction between two entities on the network produces an impression for each participating entity.

In some cases, Impressions are a tuple of length six, as shown below: $I=(a, b, o, \varphi, t, W)$, where a represents the "judging" entity or the entity which is analyzing the nature of the interaction with entity b. It follows that b is the entity being judged. The o represents the outcome of the interaction. Outcomes categorize the results of the interaction in terms of expectation variables but these will be discussed in detail later in this section. The $\varphi$ represents the weighted considerations entity attributes to the expectation variables stored in o. The t represents the time stamp of the interaction in the network. Finally, W is the level of satisfaction of entity a with respect to the interaction with entity b. This is computed in terms of the relationship between the outcome of the interaction and the weighted considerations stored in $\varphi$. It is important to note that W [−1, 1]. These impressions are then stored in a set of all impressions attributed to the "judging" entity and this set is then stored in a database of all impressions created by network interactions.

Implementing this aspect of REGRET into the SOUND platform of the present disclosure requires several adaptations. First, SOUND observes various forms of entities on the network (i.e. hosts, users, applications, etc.) and thus, it is important that their weighted considerations are specific to their networking concerns. In other words, all entities may share the same expectation variables (e.g. privilege escalation, data exfiltration, etc.) but may weigh the importance of such considerations differently. For example, a user entity may care more about data exfiltration while an application may show more concern for privilege escalation from its users.

These adaptations to REGRET can be represented as a vector version of outcomes o and weighted considerations $\varphi$. An index of an outcome represents a corresponding expectation variable and is assigned either a zero or a one, depending on whether that ontological concern of the interaction was observed. The weighted considerations vector $\varphi$ will hold the weights of each expectation variable in the corresponding index. The dot product of the o and $\varphi$ is then taken to compute the satisfaction level W. This value is in the range $[-1, 1]$.

It is also important to note that, despite REGRET's recommendation, impressions are not only stored in a centralized location. All impressions will initially pass through the SOUND Trust Service, which may apply certain policies which can modify the result of the reputation computations. Clients of the Reputation Service will be able to access the impression records in order to make networking decisions. Should the Reputation Service be compromised for some period of time, however, it is important that entities on the network can still make secure decisions. Therefore, entities will hold onto their own local beliefs based on their interaction history and can utilize these records to make decisions when the Reputation Service becomes an unreliable source of information. Moreover, entities will have access to their community members' beliefs in order to more accurately compute the reputation of the entity in question. This will be discussed in further detail later in this section when the reputation computation is outlined.

As the notion of community has appeared above it is important to define what a community is as observed by the SOUND platform. A community is a group of entities which have access to one another's local beliefs. In terms of graph theory, a community is a complete graph of nodes in which every node shares an edge with every node in the group. As with reputation, communities are dynamic and an unreliable or untrustworthy community member may become unable to connect to other members of the community.

The final concern with respect to the impressions component of SOUND is the data structure to be used for impressions storage. Impressions can be stored within a hash table mapping entities to their personal impressions. These impressions can then be hashed into buckets by interaction participant and, furthermore, by the weighted consideration vector (i.e., (b, o, $\varphi$)).

Individual to individual reputation is computed as the summation of the satisfaction level for previous interactions of pattern $I=(a, b, \_, \varphi, \_, \_)$ weighted by their recency. This is represented as the formula below, noting that:
(1) $IDB_p^a$ is the set of all impressions from entity's database with pattern p; and
(2) $R^t(IDB_p^a) \in [0,1]$).

$$R^t(IDB_p^a) = \sum_{i_j \in IDB_p^a} \rho(t, t_i) \cdot W_i$$

where $$\rho(t, t_i) = \frac{f(t, t_i)}{\sum_{i_j \in IDB_p^a} f(t_j, t)} \text{ and } f(t_i, t) = \frac{t_i}{t}$$

Reliability, which is simply the reliability of the computed reputation value, is computed utilizing two different functions as shown below:

$$RL(IDB_p^a) = (1-\mu)*N_i(IDB_p^a) + \mu*D^t(IDP_p^a)$$

Here, the first term computes a reliability weight from the number of total impressions for the pattern in question. The computation, as shown below, involves the parameter itm which is the maximum intimacy or number of interactions before an entity's reputation is forced to plateau.

$$N_i(IDB_p^a) = \begin{cases} \sin\left(\frac{\pi}{2*itm}|IDB_p^a|\right) & \text{for } |IDB_p^a| \in [0, itm] \\ 1 & \text{otherwise} \end{cases}$$

where $$D^t(IDB_p^a)$$

is the second term is the deviation of the reputation computation from each level of satisfaction, weighted by time, as shown below.

$$D^t(IDB_p^a) = \sum_{i_j \in IDB_p^a} \rho(t, t_i) \cdot |W_i - R^t(IDB_p^a)|$$

Lastly, $\mu$ is the convex combination coefficient. This coefficient sets the weight given to each of the two terms.

Reputation between individuals and communities, according to REGRET, with an emphasis on the advantages of gregarious societies, utilizes social reputation and reliability rather than an individual entity's computation, to make networking decisions. The social reputation and reliability computations involve the following components (1) both reputation and reliability are functions of the pattern being searched for in the impression database when describing the general reputation computation; (2) Entity a belongs to Community A and Entity b belongs to Community B; (3) The terms in the formulas denoted with $\omega^{a;b}$ correspond to a weight based on the number of interactions the combination of entities and/or communities have had with each other on the network over the total number of interactions between those entities and/or communities, e.g., if the weight is $\omega^{a;b}$ and entity a has had 10 interactions with Community B and there have been 50 interactions between members of Community A and Community B then $\omega^{a;b}=10/50=0.2$.

1) Individual-to-Individual Computation (Entity a's opinion of Entity b)

$$R_{a \to b}(\text{subject}) = \Sigma_{i_j \in IDB_{p^a}} \rho(t, t_i) \cdot W_i$$

$$RL(\text{subject}) = (1-\mu)*N_i(IDB_p^a) + \mu*D^t(IDP_p^a)$$

2) Individual-to-Group (Entity a's opinion of Community B)

$$R_{a \to B}(\text{subject}) = \Sigma_{b_i \in B} \omega^{a;b_i} \cdot R_{a \to b_i}(\text{subject})$$

$$RL_{a \to B}(\text{subject}) = \Sigma_{b_i \in B} \omega^{a;b_i} \cdot RL_{a \to b_i}(\text{subject})$$

3) Group-to-Individual (Community A's opinion of Entity b)

$$R_{A \to b}(\text{subject}) = \Sigma_{a_i \in A} \omega^{a_i b} \cdot R_{a_i \to b}(\text{subject})$$

$$RL_{A \to b}(\text{subject}) = \Sigma_{a_i \in A} \omega^{a_i b} \cdot RL_{a_i \to b}(\text{subject})$$

4) Group-to-Group (Community A's opinion of Community B)

$$R_{A \to B}(\text{subject}) = \Sigma_{a_i \in A} \omega^{a_i B} \cdot R_{a_i \to B}(\text{subject})$$

$$RL_{A \to B}(\text{subject}) = \Sigma_{a_i \in A} \omega^{a_i B} \cdot RL_{a_i \to B}(\text{subject})$$

5) Social Reputation

These individual calculations are then combined to compute the social reputation and reliability as follows (note that the terms denoted by $\xi$ represent a dynamic weight proportion):

$$SRL_{a \to b}(\text{subject}) = \xi_{ab} \cdot RL_{a \to b}(\text{subject}) + \xi_{aB} \cdot RL_{a \to B}(\text{subject}) + \xi_{Ab} \cdot RL_{A \to b}(\text{subject}) + \xi_{AB} \cdot RL_{A \to B}(\text{subject})$$

$$SR_{a \to b}(\text{subject}) = \xi_{ab} \cdot R_{a \to b}(\text{subject}) + \xi_{aB} \cdot R_{a \to B}(\text{subject}) + \xi_{Ab} \cdot R_{A \to b}(\text{subject}) + \xi_{AB} \cdot R_{A \to B}(\text{subject})$$

where $\xi_{ab} + \xi_{aB} + \xi_{Ab} + \xi_{AB} = 1$.

Entity α can now utilize the social reputation and reliability to decide whether it will interact with the entity in question. The social reputation will be compared to the threshold reputation on the network and the social reliability acts as a measure of the strength of this decision (a threshold reliability may also be used).

SOUND Reputation differs from the REGRET design several important ways, including, but not limited to satisfaction, patterns, tit-for-tat, and finding an accomplice. In REGRET, the W ("satisfaction") associated with an interaction is a number between 0.0 and 1.0, where higher values report greater satisfaction than lower ones. These values can be thought of as the observer's idea of what the true reputation of the observed should be. The calculation of the individual to individual reputation averages these opinions (subject to the decay of older opinions). SOUND originally used this policy, but what was discovered is that it provided far too little response to true misbehaviors. An individual could establish a good reputation relatively quickly and at that point even extremely low satisfaction responses did not nudge the average very much. To contradict this shortfall, SOUND employs a policy which treats a satisfaction value as an opinion on how much the observed entity's reputation should drop or rise. Thus, the satisfaction values are between −1.0 and 1.0. This policy results in much faster response to misbehavior.

The "pattern" (p) or "subject" element in REGRET equations is essentially a database query which matches impressions which may include multiple parameter comparisons, such as "price <$10; deliveryTime <2 days" and so on. This level of detail is appropriate to some reputation management applications, such as finding and reviewing items from a shopping or travel web site. However, in the domain of network defense, almost all the interest is in what a connection was used for, and then by extension, how bad (or good) that use was. While it may be that one bad interaction involved exfiltration of data and another involved attempting a fraudulent login, they are all bad. Each kind of interaction is given a weight of how bad it is. Some actions, such as doing a Port Scan on a network, may be part of normal network use but are very suspicious the more times they are done. Others are instantly ranked as highly dangerous, for example attempting to exfiltrate classified data. A single detected event of this type may be enough to warrant expulsion from the network.

In REGRET an outcome is a "contract" from the point of view of each side of a transaction, and the variable ϕ denotes which variable within the contract is referenced. SOUND impressions contain a single "outcome," which collapses the multi-variable outcome used by REGRET into an explicit event that has occurred. In essence the contract understood by both parties in a transaction is "Don't perform any of these actions," and the impression indicates that contract has been violated. SOUND's reputation policy is that all actions are of interest, and so the REGRET ability to extract only those of a certain type, which available in the SOUND messages, is not used. SOUND Reputation also allows more flexibility than REGRET in the "decay policy": bad results may be made to decay more slowly than good ones, for example. Finally, SOUND allows qualitative policy events to be enabled, such as "tit-for-tat" impressions and "blaming an accomplice."

Tit-for-tat, named after the strategy in Prisoner's Dilemma games, the tit-for-tag policy acts under circumstances where the offender in an interaction cannot be identified with certainty. When a misbehavior event is reported, both parties to the connection receive reputation decrements. In some cases, users of the network are not always distinguishable from the hosts they are logged into. When that is the case, if a misbehavior is identified as being "about" a host, any users logged into that host are blamed as well.

In certain embodiments of the present disclosure, all reputations are pairwise and egocentric. That is, a reputation is always what some entity or community thinks about another entity or community. The Social Reputation is a weighted amalgam of such opinions. An Identity is a unique (within a Community) representation of an entity that can engage in connections with another entity. Viewed at the simplest level, a Community is a collection of such entities and information about their interaction histories and mutual reputations. Entities can be of multiple types, including Users, Hosts, Applications, and the like. Reputation policies and calculations can be affected by what sorts of entities are involved.

In some cases, reputation information is associated with Communities. This information includes a history of received impressions, reputation details for each pair of identities that have had interactions, and a black list and white list of identities. Finally, the reputation service provides publish-subscribe endpoints for changes in reputation and receipt of new impressions reporting misbehavior. In some embodiments, SOUND has the ability to persist changes to various data (Identities, Reputation Parameters, and Subscriptions) and restore it if the Platform is restarted.

Figure 1A:
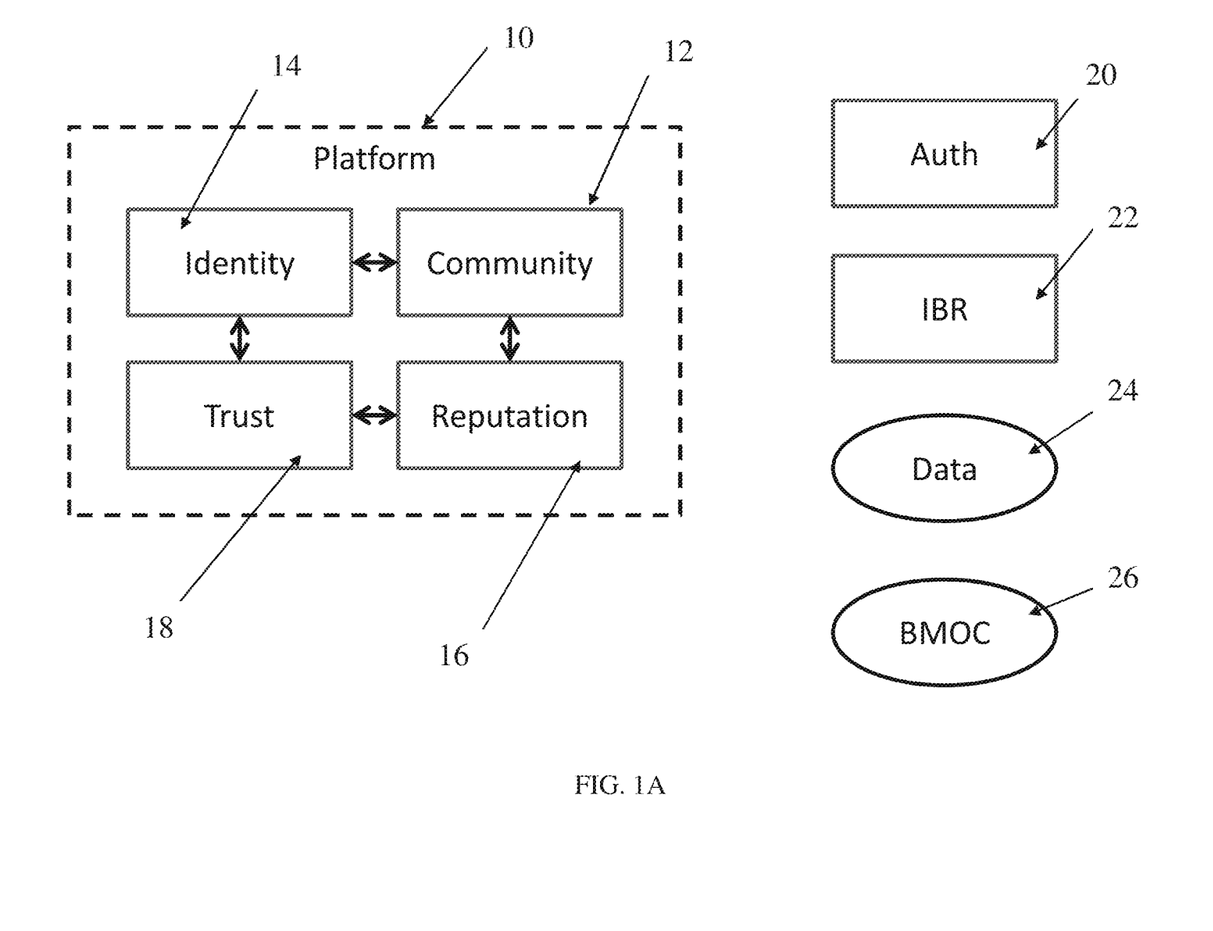
FIG. 1A shows a diagrammatic view of one embodiment of the SOUND Reputation system according to the principles of the present disclosure.

FIG. 1A is a schematic overview of one embodiment of the SOUND Reputation environment. In this embodiment, there are two sections. The section to the left, labeled Platform 10, illustrates the components of SOUND that perform all the work of maintaining and updating reputations. These modules all interact with each other, as indicated by the double-ended arrows. Community 12 holds and maintains all information about specific Communities in the particular environment. Identity 14 holds and maintains all information about Identities, which may include names, types, references to aliases used in other Communities, authentication tokens, and on the like. Reputation 16 holds all information about events that have occurred, and performs the calculations which produce Reputation tuples.

Trust 18 orchestrates incoming events and directs them to the appropriate modules of the Reputation system to be processed.

Still referring to FIG. 1A, the section to the right shows four independent elements that can be optionally part of the SOUND Reputation environment. AUTH 20, if needed, handles Identity (user, host, etc.) authentication using appropriate methods and keys for the platform on which it is running. IBR 22, is short for Introduction-Based Routing, and this module can enable or disable access between Identities and Communities. IBR is an optional part of SOUND. Data 24 is an example of an optional additional module to SOUND that provides an extra layer of protection for database access and modification. BMOC 26 (Blueforces Mission-Oriented Command Center) is an example of one sort of web-based command console that could be used in some embodiments to allow operators to monitor the state of the Communities that SOUND is protecting.

Figure 1B:
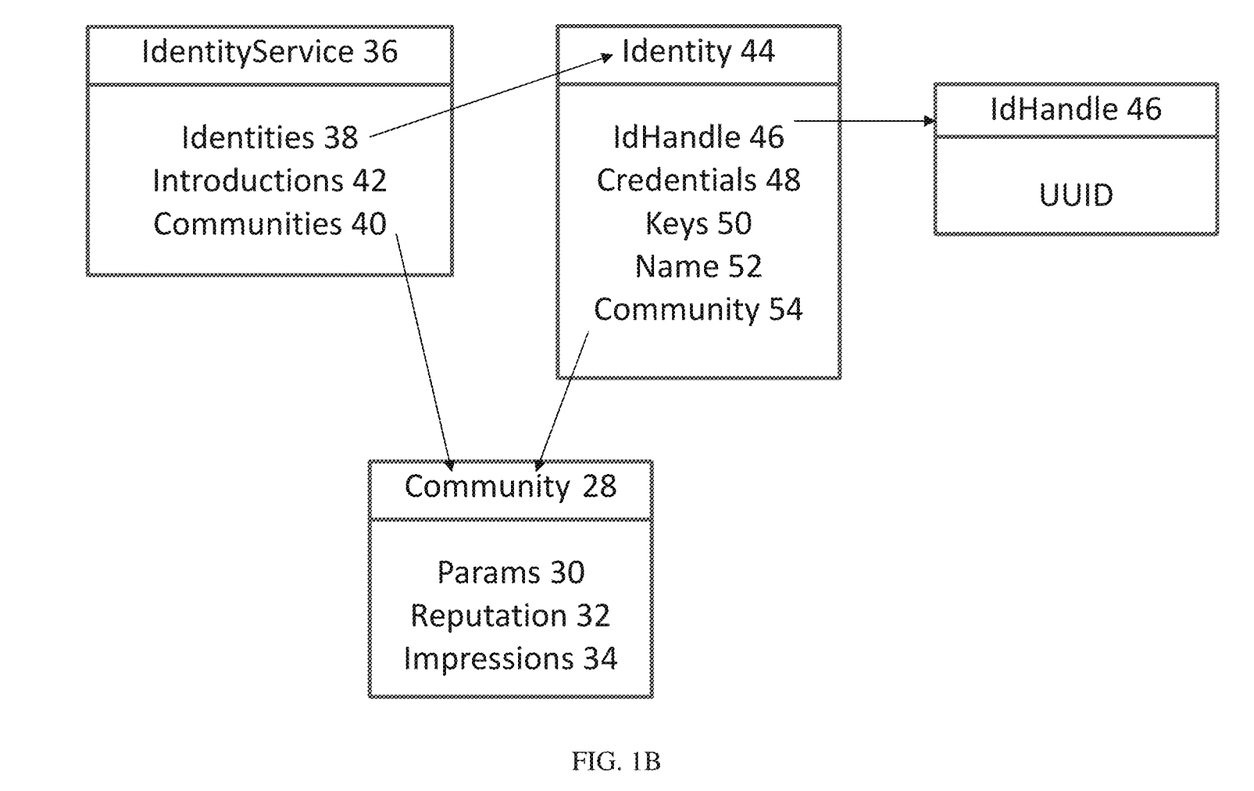
FIG. 1B shows an overview of some of the basic objects in one embodiment of the SOUND Reputation system and the links between them.

Referring to FIG. 1B four of the data classes in one embodiment of the SOUND Reputation system and their contents and interrelations are shown. These data classes represent one possible embodiment of the basic information required for SOUND Reputation to operate. The Community 28 contains the Params 30, which are parameters for the reputation calculations; for example, the point at which a reputation becomes "bad." The Community also contains the Reputations 32 of all Identities it manages, and the Impressions 34 that are used to derive those Reputations. The Community 28 relies upon the Identity Service 36 to store and manage all Identities 38 and Communities 40 known to it. The Identity Service also knows which Identities are known to multiple Communities and keeps track of Introductions 42. An Identity 44 contains a unique-across-the-system IdHandle 46 (e.g., UUID), a local Name for the Identity, reference to the Community of which it is a part, authentication information such as credentials 48 and encryption keys 50 unique to that Identity, and the like 52. Arrows in the diagram indicate references between objects; for example, the Identity Service 36 has references to all Communities 40, 28, and Identities 44 have a reference to the parent Community 54, 28 of the Identity 44. Different embodiments of the SOUND Reputation system may define these objects and their component relationships differently.

Figure 1C:
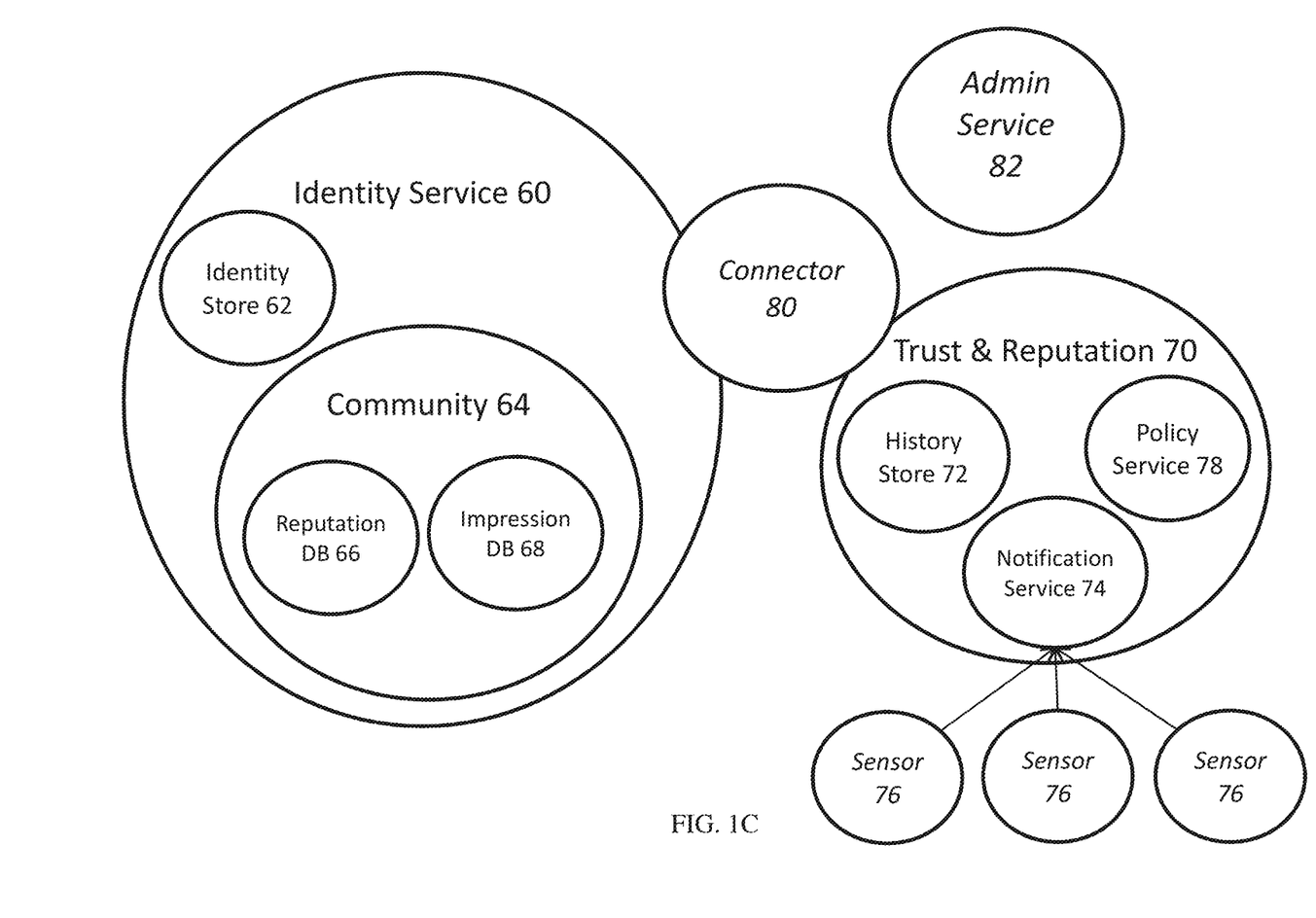
FIG. 1C shows an overview of the component relations between SOUND Reputation elements according to the principles of the present disclosure.

Referring to FIG. 1C the objects that make up one embodiment of the SOUND Reputation system are shown from a different point of view than FIG. 1B. Each oval is placed within its parent object; for example, the Identity Service 60 contains the Identity Store 62 (the database of all known Identities). A Community 64 contains a Reputation DB 66 (database) and an Impression DB 68 (database). The Community itself 64 is contained in the Identity Service 60. Trust & Reputation 70 contains a History Store 72 (a database of all Impressions received). In certain embodiments, one active element of Trust & Reputation 70 is the Notification Service 74, which receives and manages incoming Impressions from multiple Sensors 76. Sensor Impressions are processed and Reputations are created within the Policy Service 78, which may itself have different implementations in different embodiments of SOUND Reputation. In certain embodiments, a connector 80 facilitates connections between the Identity Service 60 and the Trust & Reputation 70 modules. In some embodiments of the SOUND Reputation system, an Admin Service 82 facilitates changing of policy parameters and the like.

Figure 2A:
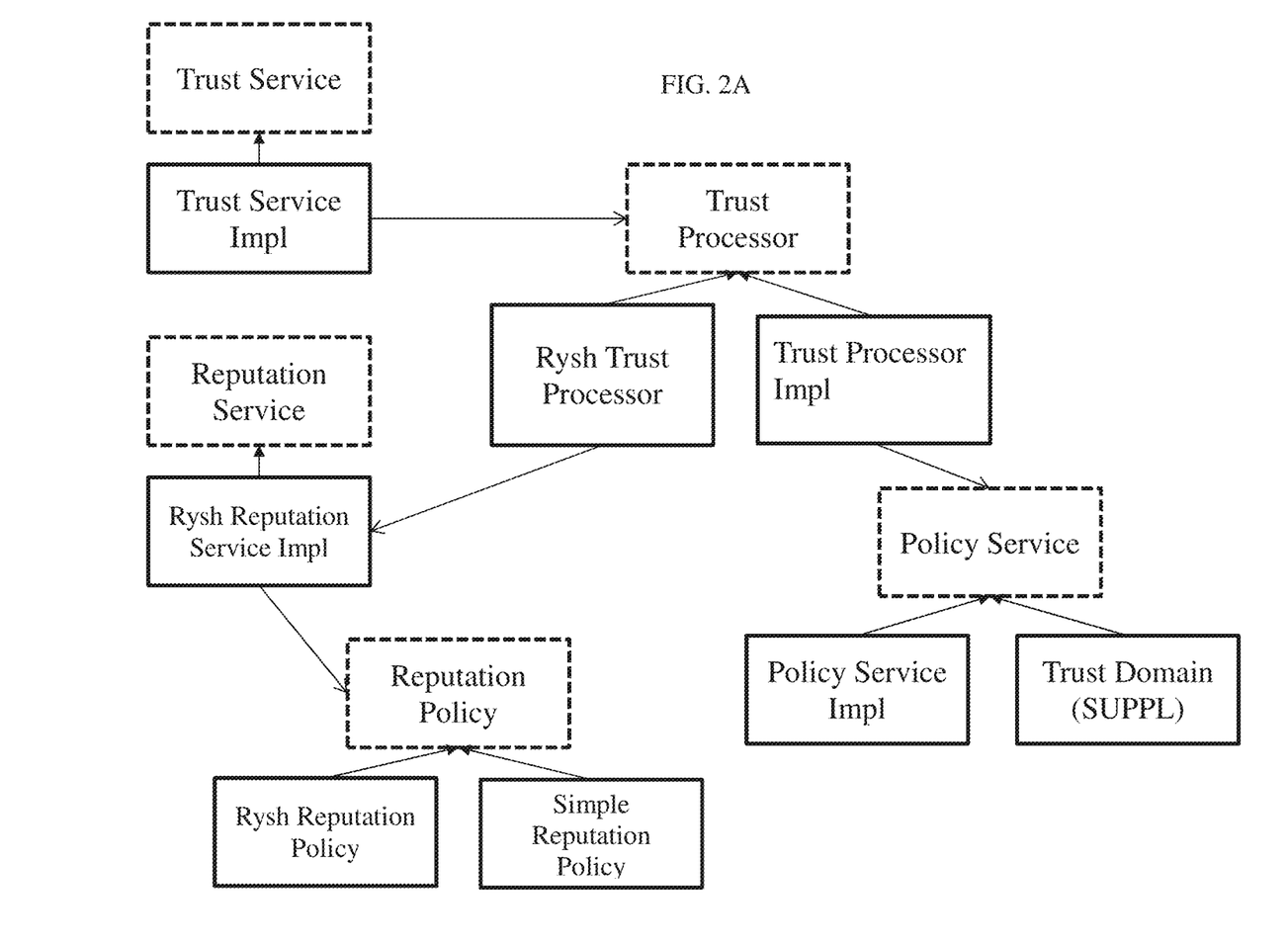
FIG. 2A shows an overview of one embodiment's component parent-child relations and the links between components according to the principles of the present disclosure

FIG. 2A shows how one embodiment of SOUND Reputation defines the elements that make up the Reputation processing portion of the system, in terms of interfaces and implementations, using the conventions of object-oriented languages such as Java, C++, or the like. In this embodiment, a Java implementation was used. Interfaces, which define the behavior of a component but allow it to be implemented in multiple ways, are within dashed borders. Implementations, which provide the actual code for an Interface, are within solid borders, and are connected to the Interface they implement by a solid arrow from the implementation to the Interface. An open-headed arrow represents containment of one object by another, and points from the container to the contents. Trust Service, Trust Processor, Reputation Service, Reputation Policy and Policy Service are all interfaces. In the case of the Trust Processor interface, Rysh Trust Processor is the implementation that processes incoming Impressions. It invokes the Rysh Reputation Service Impl service, which can apply any Reputation Policy to the inputs. Rysh Reputation Policy is the standard embodiment of reputation processing used in SOUND Reputation. Simple Reputation Policy is an alternate embodiment that uses a much simpler reputation model that moves a reputation up or down without any further calculations. Simple Reputation Policy is similar to the reputation model used in IBR.

Figure 2B:
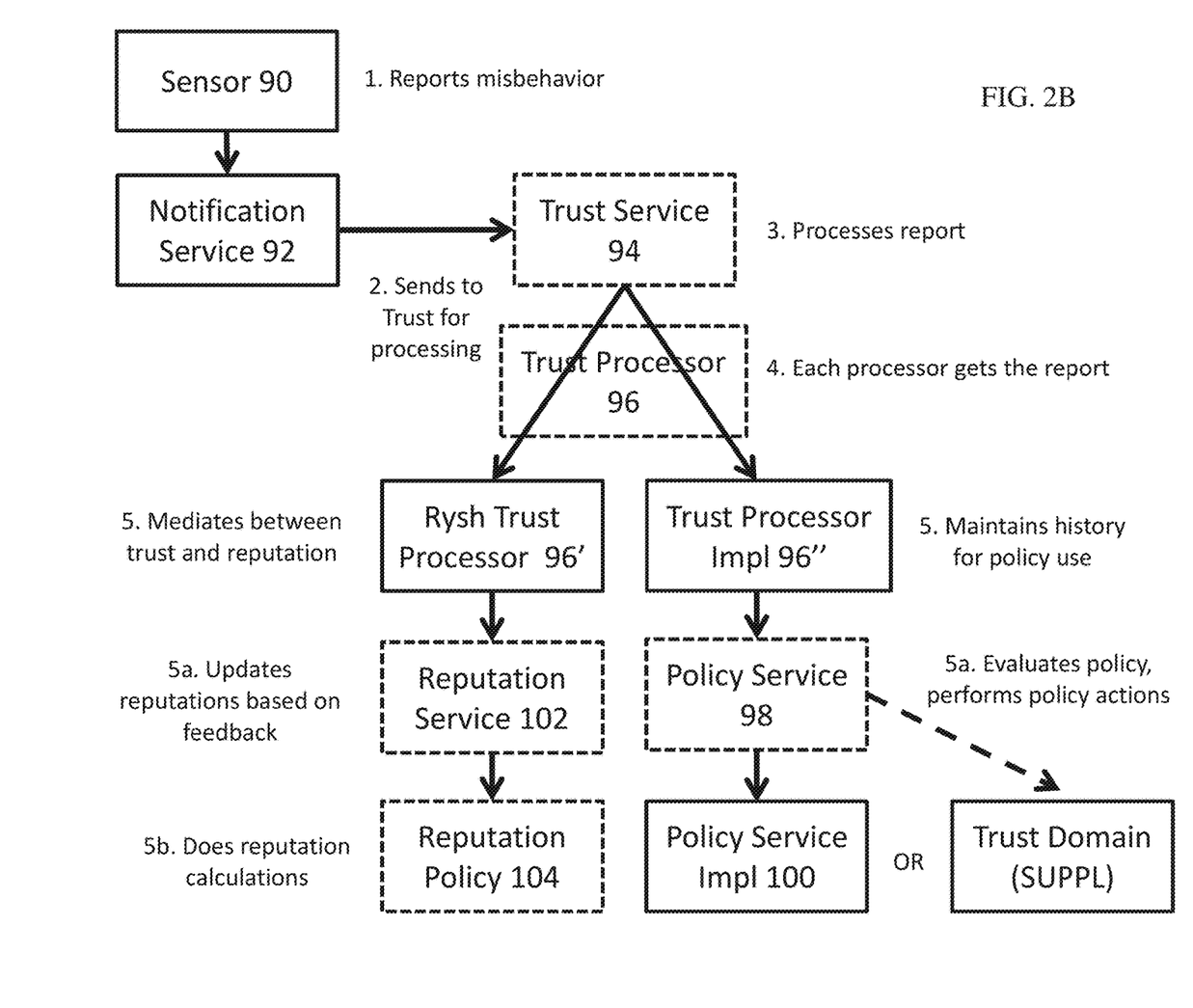
FIG. 2B shows one embodiment of the flow of Impression (aka Misbehavior) information from when it first is reported by a Sensor to when it is acted upon by a Reputation Policy according to the principles of the present disclosure.

FIG. 2B shows an example "flow chart" of how the SOUND Reputation system responds to a new report. The flow of information is indicated by directional arrows. First (1) a Sensor 90 detects a reportable event and puts together a SoundMessage that describes the event. It will typically include which Identities were involved the event, what type of event it was, and the suggested impact on reputation of the event. The message is conveyed to the Notification Service 92, which distributes it to all subscribers (2). In this illustration, the SOUND Trust Service 94 is the subscriber shown. It initiates processing (3) of the event report by passing it to the currently available Trust Processors 96 (4). In this illustration, there are two (96', 96"), although this is not required: there may be any number of such processors. The Trust Processor Impl 96" ("impl" means "implementation") uses the available Policy Services 98 to determine the response to the event (5). It may invoke one or more policy service implementations to do so. In this illustration, the Policy Service Impl 100 is invoked (5a). "Policies" are often used to correlate different types of events that may be related. There is no requirement that the Policy Service invokes any implementation or produces any action once invoked. The more commonly used Trust Processor 96, 96', 96" is the Reputation Service 102. As described in previous sections, the Reputation Service 102 takes in an event and algorithmically recalculates the reputations affected by the new information contained in the event (5a, 5b). It may optionally take an action after doing so, though this is not required. In some cases, it may simply report the new reputations to its subscribers, some of whom may decide to take action based on the new information. In other cases, it may (to use an example) bar the offending identity from being able to make new connections. In others, it might notify a third-party subscriber able to perform a "deep inspection" of all interactions initiated by an offender. The may be dictated by a Reputation Policy 104. Shown in FIG. 2A and FIG. 2B, SUPPL is an additional trust system compatible with SOUND Reputation. It is included to illustrate that SOUND can support more than one Trust Policy.

Figure 3:
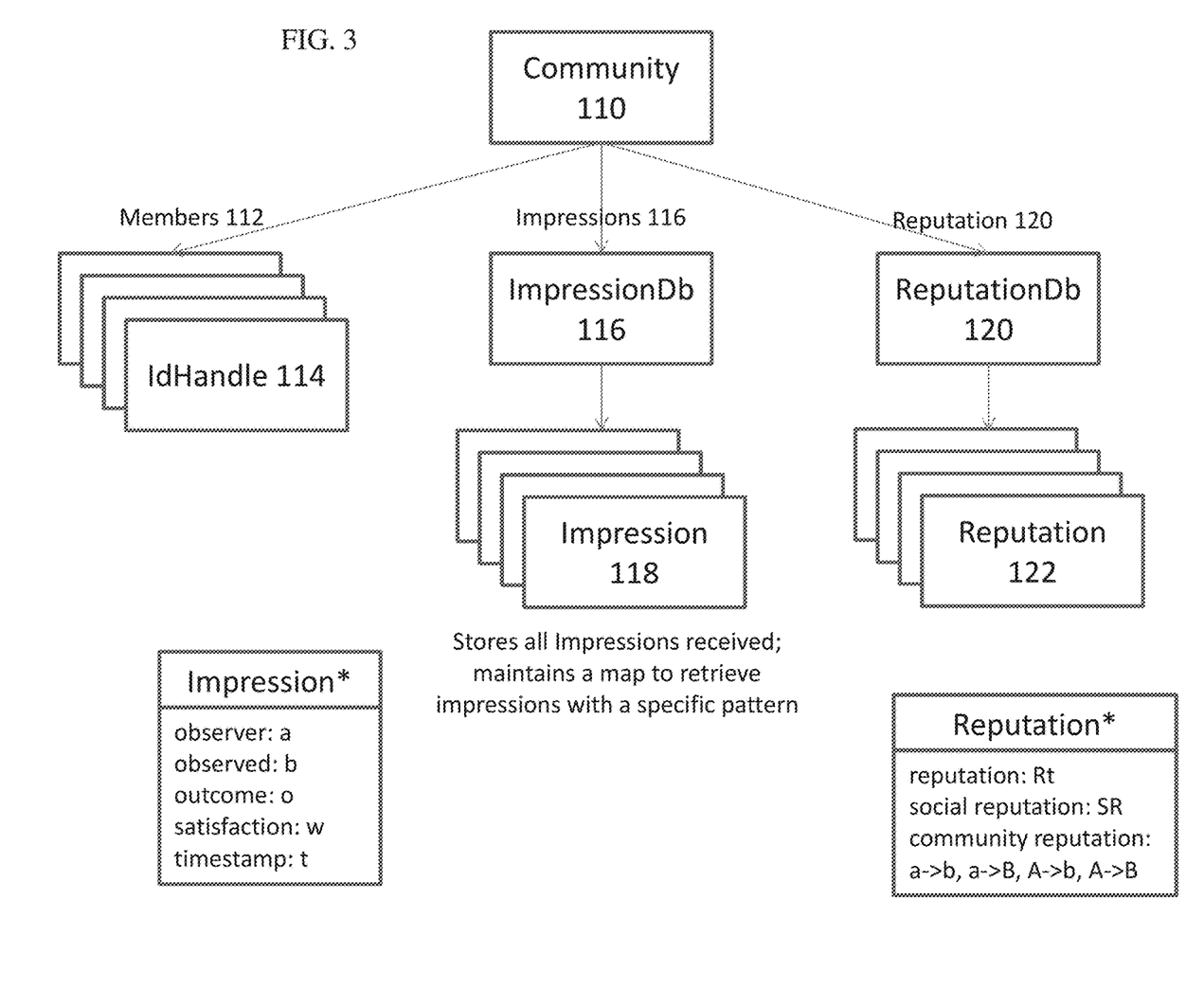
FIG. 3 shows the objects that embody the object representations key to one embodiment of the SOUND Reputation system, including where they are stored and what data they contain.

FIG. 3 shows the ownership and containment relationships among various objects that make up one embodiment of a SOUND Community. These relationships are indicated by arrows connecting the owner or container objects and the contained or owned objects. A Community 110 contains several databases that together represent those aspects of the Community relevant to Reputation. The Members database 112 consists of IdHandles 114, each of which is a unique identifier of an Identity that is a member of the Community. The Impression database 116 stores all Impressions received by the Community. An Impression object 118 contains all elements reported from a Sensor observation of behavior, as used to update the Reputation of an Identity.

Still referring to FIG. 3, these impression object elements are the observer a, which is the IdHandle of the reporter; the observed b, which is the IdHandle of the identity reported against; the outcome o, which identifies the event that occurred; the satisfaction w, which is the severity of the event; and the timestamp t, is when the event occurred.

The Reputation database 120 holds the calculated Reputations 122 for all identities in the Community, which are retrieved using the IdHandle of the Identity. The elements of a Reputation are reputation Rt, which is the current value, between 0 and 1, of the Identity's basic Reputation, the social reputation SR, which is calculated by combining four different elements of a "community" reputation. Taking a as the observer and b the observed identity, and A as the Community in which a resides and B as the community in which b resides, the reputation elements are combined based on each contributing a fraction of the final social reputation. For example, each might contribute 25% of the final value, or a's opinion of b and A's opinion of B may be given higher weights, such as 30% or 40% each. These proportions may vary from Community to Community.

In one embodiment, during operation of a SOUND-protected network, reputation information flows from Sensors through SOUND-IBR and the SOUND Platform, and the results are communicated to Subscribers. In some cases, sensors are the originators of alerts about (typically bad) behavior. Sensors can gather the information that triggers such an alert themselves, or can extract it from logs kept by independent applications such as Snort. In certain embodiments, sensors use a subset of a more general message passing mechanism to report behavior, the SoundMessage class. A SoundMessage can contain all the information needed to characterize behavior: an observer, an observed, and so on.

In certain embodiments, SOUND-IBR, a customization of IBR via a specially written plugin, among other things, delegates reputation related queries to SOUND Reputation. In certain configurations, SOUND-IBR is skipped, and policies are applied in the Reputation Service itself. In many cases, Trust is the first part of SOUND to handle alerts. Trust has the ability to apply policy before sending the alert on to Reputation.

In one embodiment of the present disclosure, Reputation does all the reputation processing, maintains the reputation databases, and provides endpoints to modify parameters, add or remove identities from black and white lists, resets reputations, etc. In some cases, Reputation also publishes updates to subscribers. Subscribers may receive notification of misbehavior events, changes to reputation, etc. In one example, the SOUND-IBR plugin can receive reputation updates asynchronously and store them in a "backup" internal database to use if the Reputation service isn't operational.

In certain embodiments, outcomes are the defined behaviors that can occur in the system, both good and bad. Their effect on reputation can be varied along many axes. Different communities may have different parameter sets, for example, different entity types (users, hosts, etc.) may be treated differently. In some cases, reputation changes per event are higher for user identities than for host identities. In some cases, outcomes are defined in an XML file which can be hand-edited to add new behaviors. Outcomes are defined as either "good" or "bad," and contain optional additional values. If the values are not supplied, Community defaults may be used instead.

In one embodiment, Satisfaction is the amount by which the reputation of an observed entity (from the point of view of the observer entity) should be increased or decreased as the result of an event. The value varies between −1.0 and 1.0. In some cases, decayTime is the amount of time it takes a particular event to decay. Once an event has fully decayed it no longer affects reputation. A decayFunction is a function of elapsed time and decay time which determines the shape of the decay curve. For example, a delay curve can be a straight line, or a more precipitated decline, or any other function. The satisfaction in an event is multiplied by the current value (between 0.0 and 1.0) produced by the decay function at the time of evaluation. So, as time passes, the value will change and will be zero after the full decay time has elapsed (by definition, regardless of the function itself). It is to be understood that polices may require different behaviors to have different decay functions.

Figure 4:
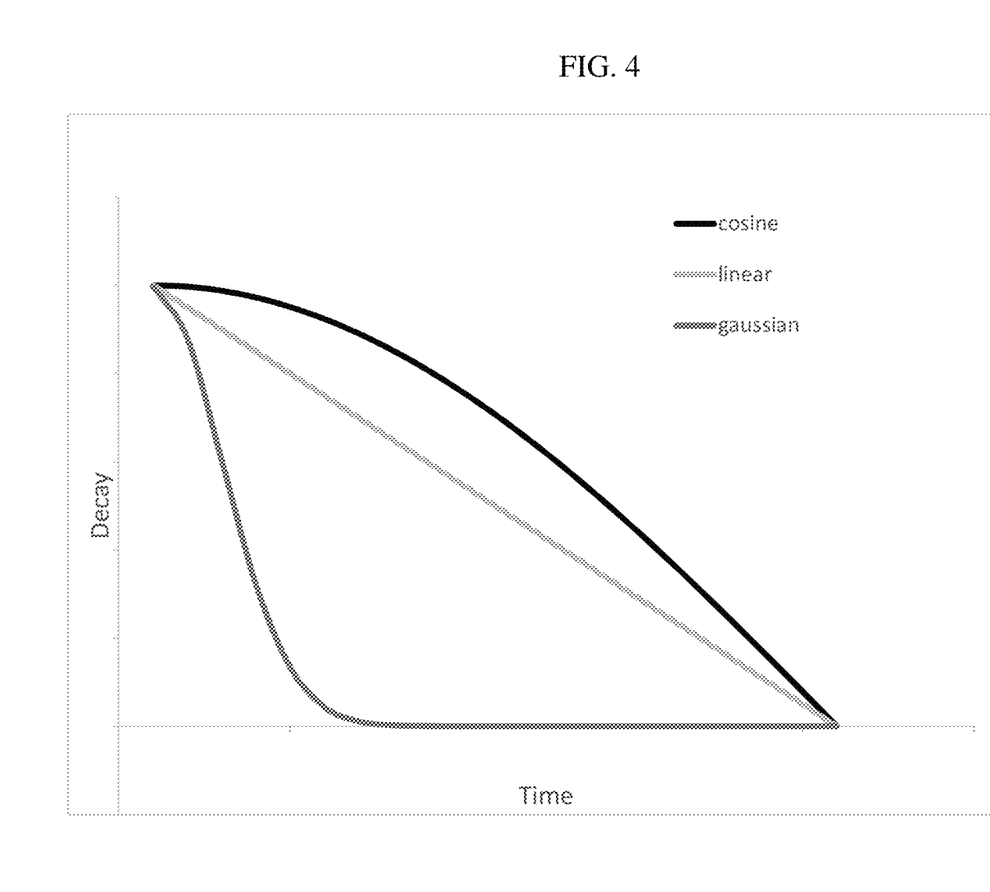
FIG. 4 shows a plot of various decay functions used in policies in one embodiment of the present disclosure.

Referring to FIG. 4, a plot of various decay functions used in policies in one embodiment of the present disclosure is shown. More specifically, there are multiple decay functions to choose from. In one embodiment, the policy is to use functions which decay "good" interactions more steeply than "bad" ones. Also, "good" interactions decay more rapidly, by a factor of two, than "bad" ones. These policies are of course changeable. In one embodiment, the Cosine curve was used for misbehaviors and the Gaussian curve was used for good behavior.

In certain embodiments, Communities have parameters that hold for the community as a whole, but can be changed for individual cases. Some of the parameters are 1) default decay time—the normal time it takes for an event to fully decay; 2) default decay function—the decay function to use if no other one is specified; 3) low reputation—the value at which a reputation is considered "bad" and connections involving it are closed and will not reopen; and 4) intimacy—the number of interactions between a pair of entities that must be reached before they "know each other." In certain embodiments, typical values for "low" reputation are 0.5 and 0.6. In certain embodiments, typical values for in intimacy have been 10 and 0; in the latter case there is no penalty for not "knowing" the other participant.

In one embodiment of the present disclosure, there are four social reputation proportions. The first, a2b, is the proportion of the social reputation taken from the reputation of entity b from the point of view of entity a. This number ranges from 0.0 to 1.0. Typically it is set to 0.5. The second, a2B, is the proportion of the social reputation taken from the reputation of community B from the point of view of entity a. This number ranges from 0.0 to 1.0. Typically it is set to 0.1. The third, A2b, is the proportion of the social reputation taken from the reputation of entity b from the point of view of community A. This number ranges from 0.0 to 1.0. Typically it is set to 0.3. The fourth, A2B, is the proportion of the social reputation taken from the reputation of community B from the point of view of community A. This number ranges from 0.0 to 1.0. Typically it is set to 0.1. The sum of these proportions must equal 1.0.

Figure 5:
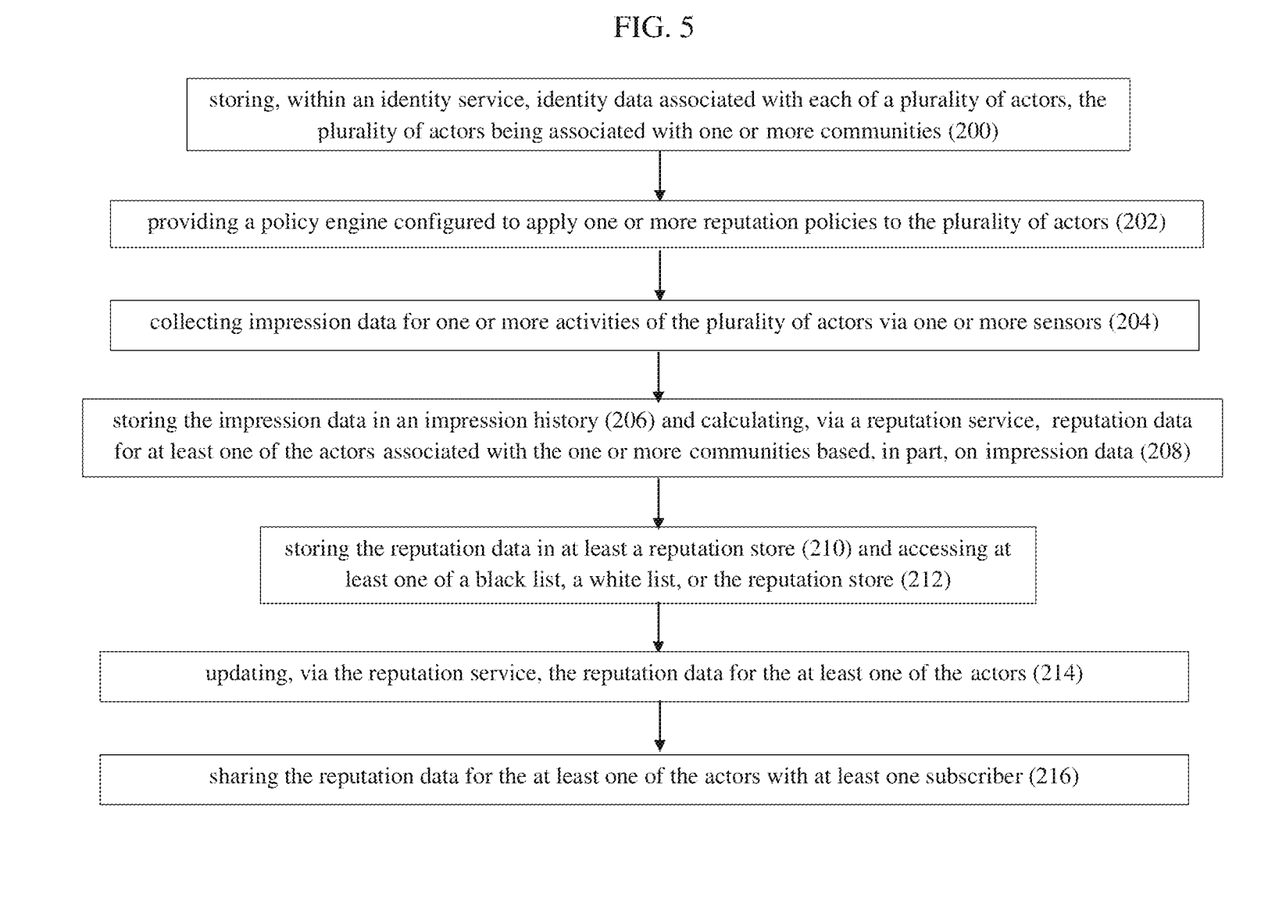
FIG. 5 shows one embodiment of a method according to the principles of the present disclosure.

Referring to FIG. 5, one embodiment of a method according to the principles of the present disclosure is shown. More specifically, the method stores, within an identity service, identity data associated with each of a plurality of actors, the plurality of actors being associated with one or more communities (200). A policy engine is provided that is configured to apply one or more reputation policies to the plurality of actors (202). Impression data is collected for one or more activities of the plurality of actors via one or more sensors (204). The impression data is stored in an impression history (206) and a reputation service calculates reputation data for at least one of the actors associated with the one or more communities based, in part, on impression data (208). The reputation data is stored in at least a reputation store (210). In some cases, the system accesses at least one of a black list, a white list, or the reputation store (212). The reputation service updates the reputation data for the at least one of the actors (214) and shares the reputation data for the at least one of the actors with at least one subscriber (216) to provide for an improved method of network security.

It will be appreciated from the above that the disclosure may be implemented as computer software, which may be supplied on a storage medium, or via a transmission medium, such as a local-area network or a wide-area network, such as the Internet. It is to be further understood that, because some of the constituent system components and method steps depicted in the accompanying Figures can be implemented in software, the actual connections between the systems components (or the process steps) may differ depending upon the manner in which the present disclosure is programmed. Given the teachings of the present disclosure provided herein, one of ordinary skill in the related art will be able to contemplate these and similar implementations or configurations of the present disclosure.

It is to be understood that the present disclosure can be implemented in various forms of hardware, software, firmware, special purpose processes, or a combination thereof. In one embodiment, the present disclosure can be implemented in software as an application program tangible embodied on a computer readable program storage device. The application program can be uploaded to, and executed by, a machine comprising any suitable architecture.

The computer readable medium as described herein can be a data storage device, or unit such as a magnetic disk, magneto-optical disk, an optical disk, or a flash drive. Further, it will be appreciated that the term "memory" herein is intended to include various types of suitable data storage media, whether permanent or temporary, such as transitory electronic memories, non-transitory computer-readable medium and/or computer-writable medium.

While various embodiments of the present disclosure have been described in detail, it is apparent that various modifications and alterations of those embodiments will occur to and be readily apparent to those skilled in the art. However, it is to be expressly understood that such modifications and alterations are within the scope and spirit of the present disclosure, as set forth in the appended claims. Further, the disclosure(s) described herein is capable of other embodiments and of being practiced or of being carried out in various other related ways. In addition, it is to be understood that the phraseology and terminology used herein is for the purpose of description and should not be regarded as limiting. The use of "including," "comprising," or "having," and variations thereof herein, is meant to encompass the items listed thereafter and equivalents thereof as well as additional items while only the terms "consisting of" and "consisting only of" are to be construed in a limitative sense.

The foregoing description of the embodiments of the present disclosure has been presented for the purposes of illustration and description. It is not intended to be exhaustive or to limit the present disclosure to the precise form disclosed. Many modifications and variations are possible in light of this disclosure. It is intended that the scope of the present disclosure be limited not by this detailed description, but rather by the claims appended hereto.

A number of implementations have been described. Nevertheless, it will be understood that various modifications may be made without departing from the scope of the disclosure. Although operations are depicted in the drawings in a particular order, this should not be understood as requiring that such operations be performed in the particular order shown or in sequential order, or that all illustrated operations be performed, to achieve desirable results.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure.

What is claimed:

1. A network security method comprising:
storing, within an identity service, identity data associated with each of a plurality of actors, the plurality of actors being associated with one or more communities and having associated reputations which are aggregated and updated as new information about each actor's activity is sensed and reported according to a reputation policy;
providing a policy engine configured to apply one or more reputation policies to each of the plurality of actors;
sensing impression data for one or more activities of the plurality of actors via one or more sensors, wherein the impression data is a report on an interaction that includes at least one of an observer, an observed, an outcome, a rating, and a timestamp;
storing the impression data in an impression history;
calculating, via a reputation service, reputation data for at least one of the actors associated with the one or more communities based, in part, on the impression data;
storing the reputation data in at least a reputation store;
accessing at least one of a black list, a white list, or the reputation store;
updating, via the reputation service, the reputation data for the at least one of the actors; and
reporting the reputation data for the at least one of the actors to at least one subscriber; and
calculating a reputation of one or more of a social reputation, a subjective reputation, or a social reliability, and wherein calculating the social reputation includes a plurality of proportional contributions which reflect different categories of the observer, the observed, and different views of those categories.

2. The network security method according to claim 1, wherein the plurality of actors comprises users, hosts, and applications.

3. The network security method according to claim 1, wherein the black list represents lists of identities that are never allowed to connect regardless of their reputation and the white list represents lists of identities that are always allowed to connect regardless of their reputation.

4. The network security method according to claim 1, wherein the one or more reputation policies comprise reputation parameters including reputation threshold values for the plurality of actors and decay rates for the one or more activities of the plurality of actors.

5. The network security method according to claim 4, wherein the one or more reputation policies comprise configurable reputation parameters including the ability to add or subtract members from the black list and/or the white list.

6. The network security method according to claim 4, wherein the configurable reputation parameters further include associating different decay curves with different identities, categories of identities, communities, or categories of behavior.

7. The network security method according to claim 1, wherein the proportional contributions includes a2b, A2b, a2B, and A2B.

8. The network security method according to claim 1, wherein the reputation data comprises all undecayed impressions attributed to interactions of individual to individual, individual to community, and community to community.

9. The network security method according to claim 1, further comprising linking the identities of actors from multiple communities such that their reputations are affected by actions in each community, rather than being independent.

10. The network security method according to claim 1, wherein sharing the reputation data comprises a subscription service to provide notifications of changes in reputation for various members of the network.

11. The network security method according to claim 1, further comprising automatically acting on shared the reputation data including enabling or disabling access between individual actors and communities.

12. The network security method according to claim 1, wherein the four proportional contributions come from identities' views of other identities, or of the community or communities another identity is a member of.

13. The network security method according to claim 1, wherein the four proportional contributions come from communities' views of other identities, or of the community or communities another identity is a member of.

14. A network security system comprising:
one or more external sensors;
a database of identities;
a database of received impressions, wherein the received impressions include at least one of an observer, an observed, an outcome, a rating, and a timestamp;
a database of reputations; and
a set of reputation parameters that may be set at start-up time or optionally during a session, wherein components are configured to calculate current reputations between pairs of identities and store them in the reputation database,
wherein calculating the current reputations includes calculating one or more of a social reputation, a subjective reputation, or a social reliability, and wherein calculating the social reputation includes a plurality of proportional contributions which reflect different categories of the observer, the observed, and different views of those categories.

15. The network security system according to claim 14, further comprising a trust service configured to query at least the reputation database to determine if a pair of identities are permitted to connect.

16. The network security system according to claim 14, further comprising an identity service configured to store authentication information about Identities.

* * * * *